(12) United States Patent
Horikiri

(10) Patent No.: US 10,768,802 B1
(45) Date of Patent: Sep. 8, 2020

(54) INFORMATION PROCESSING APPARATUS AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Kazunori Horikiri, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/518,963

(22) Filed: Jul. 22, 2019

(30) Foreign Application Priority Data

Feb. 25, 2019 (JP) ................................ 2019-031248

(51) Int. Cl.
| | | |
|---|---|---|
| G09G 5/00 | (2006.01) | |
| G06F 3/0487 | (2013.01) | |
| G06Q 10/10 | (2012.01) | |
| G06F 3/0482 | (2013.01) | |
| G06F 40/169 | (2020.01) | |

(52) U.S. Cl.
CPC .......... *G06F 3/0487* (2013.01); *G06F 3/0482* (2013.01); *G06F 40/169* (2020.01); *G06Q 10/10* (2013.01)

(58) Field of Classification Search
CPC ...... G06F 3/0482; G06F 3/0487; G06F 17/00; G06F 40/169; G06Q 10/10; G09G 5/38; G09G 2320/103; G09G 2340/0464
See application file for complete search history.

(56) References Cited

U.S. PATENT DOCUMENTS

| | | | |
|---|---|---|---|
| 7,653,872 B2 | 1/2010 | Yamashita et al. | |
| 2006/0129944 A1* | 6/2006 | Berquist | G06T 3/00 |
| | | | 715/764 |
| 2006/0239248 A1* | 10/2006 | Hawk | H04L 67/36 |
| | | | 370/352 |
| 2014/0344717 A1* | 11/2014 | Yamazoe | G06F 3/0482 |
| | | | 715/753 |
| 2015/0121191 A1* | 4/2015 | Nakamori | G06F 40/169 |
| | | | 715/230 |
| 2017/0242647 A1* | 8/2017 | Nakamori | G06F 3/147 |
| 2017/0272806 A1* | 9/2017 | Hisano | G06F 3/0484 |
| 2017/0277504 A1* | 9/2017 | Horikiri | G06F 9/451 |
| 2018/0276581 A1* | 9/2018 | Sakurai | G06Q 10/10 |
| 2019/0220802 A1* | 7/2019 | Horikiri | G06Q 10/063118 |

FOREIGN PATENT DOCUMENTS

| | | |
|---|---|---|
| JP | 2005-228262 | 8/2005 |
| JP | 2006-004361 | 1/2006 |
| JP | 2006-018493 | 1/2006 |
| JP | 2015-095066 | 5/2015 |

* cited by examiner

Primary Examiner — Joe H Cheng
(74) Attorney, Agent, or Firm — JCIPRNET

(57) ABSTRACT

An information processing apparatus includes a display unit that displays a predetermined region and a sticky-note on a pasteboard; a setting unit that sets a condition for executing a procedure and the procedure on a first sticky-note arranged in the region; and an execution unit that executes the procedure set for the first sticky-note on contents of a second sticky-note arranged outside the region on the pasteboard in a case where the second sticky-note satisfies the condition set for the first sticky-note within the region.

8 Claims, 16 Drawing Sheets

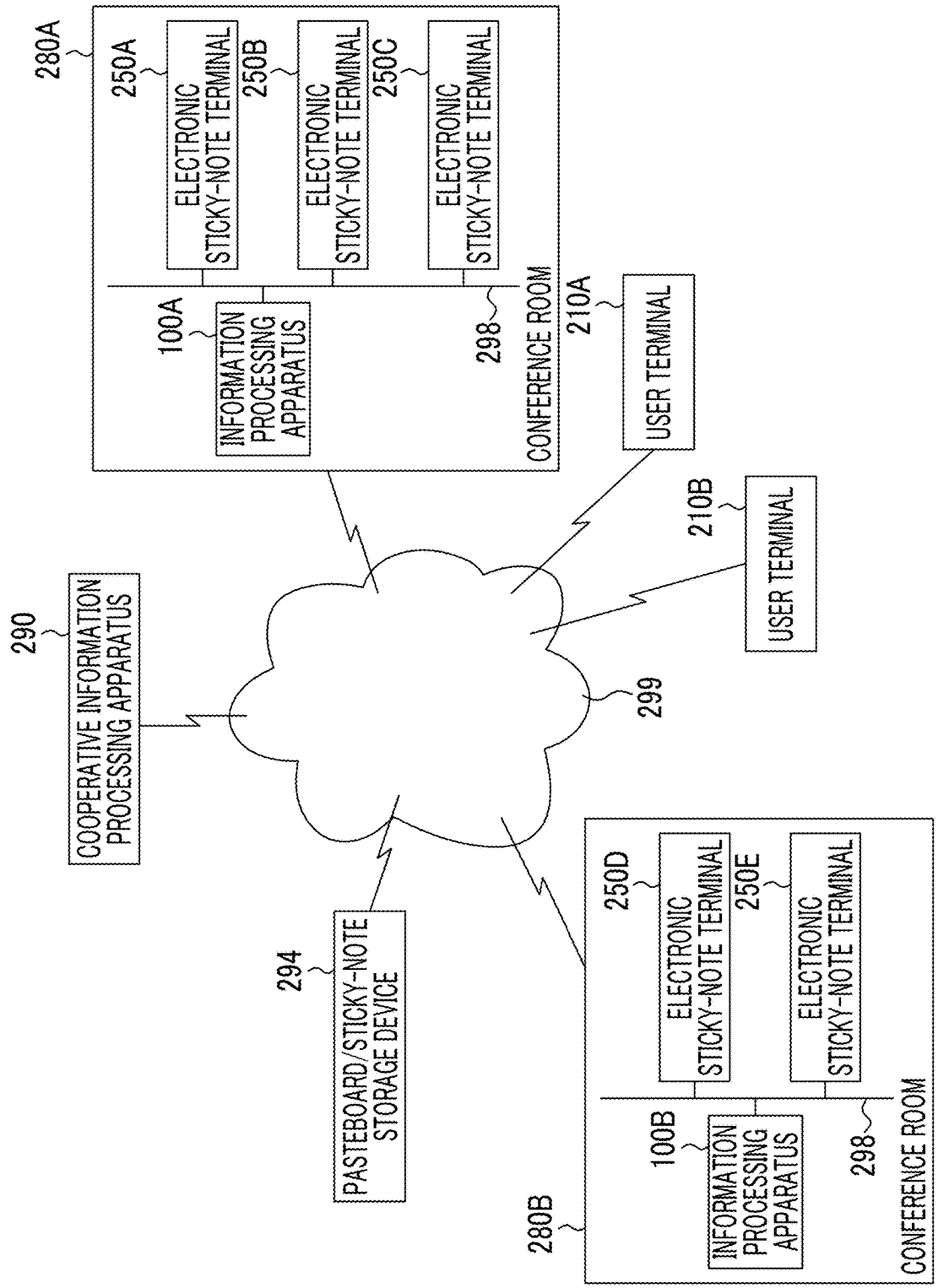

FIG. 4

| MEETING ID | MEETING NAME | DATE-AND-TIME | PASTEBOARD ID | PARTICIPANT NUMBER | PARTICIPANT ID |
|---|---|---|---|---|---|
| | | | | | |

| PASTEBOARD ID | PASTEBOARD PATTERN ID | CREATION DATE | CREATOR |
|---|---|---|---|
| | | | |

| 610 | 615 | 620 | 625 | 630 | 635 | 640 | 645 | 650 |
|---|---|---|---|---|---|---|---|---|
| STICKY-NOTE ID | PASTEBOARD ID | ATTACHMENT POSITION | SIZE | CREATION DATE | CREATOR | ATTACHMENT DATE | COLOR | FRAME SHAPE |
| F0001 | D0001 | (100, 200) | (10, 5) | | KF | | | |

| 655 | 660 | 665 | 670 | 675 | 680 |
|---|---|---|---|---|---|
| FRAME COLOR | FRAME THICKNESS | IN-GROUP FIELD | TYPE | CONTENT TYPE | CONTENT |
| | | | | TEXT | |

| LEGEND STICKY-NOTE ID | LEGEND REGION ID | CONDITION | PROCEDURE |
|---|---|---|---|
| | | | |

| PERSON-IN-CHARGE | ToDo | MESSAGE |
|---|---|---|
| MR. A | PREPARING SPECIFICATION | PLEASE PREPARE SPECIFICATION REFERRING TO DOCUMENT X |

FIG. 15

| ToDo ID | PERSON-IN-CHARGE | ToDo | MESSAGE |
|---|---|---|---|
| 1 | MR. A | PREPARING SPECIFICATION | PLEASE PREPARE SPECIFICATION REFERRING TO DOCUMENT X |
| 2 | MR. B | CREATING PROGRAM | PLEASE FINISH THE WORK BY (DATE) |

INFORMATION PROCESSING APPARATUS AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2019-031248 filed Feb. 25, 2019.

BACKGROUND

(i) Technical Field

The present disclosure relates to an information processing apparatus and a non-transitory computer readable medium storing an information processing program.

(ii) Related Art

JP2015-095066A relates to an invention made to provide an information processing apparatus which performs processing associated with a sticky-note in a case where the processing is conducted on a sticky-note attached to a pasteboard but the sticky-note is already in a predetermined state without user's instruction operation for performing the processing, which discloses that a detection unit of the information processing apparatus detects an operation on the sticky-note attached to the pasteboard, a determination unit determines whether the sticky-note detected by the detection unit is in a predetermined state or not, and a processing unit performs the processing associated with the sticky-note in a case where the determination unit determines that the sticky-note is in the predetermined state.

JP2005-228262A relates to an invention to separate an annotation added to electronic data from the electronic data to obtain the handleable annotation, which discloses that when a sticky-note is attached to a document by means of a document utilization tool, an annotation extraction unit extracts the sticky-note from the document, a message creation unit converts a text written in the sticky-note into a message available in mail delivery, a message management unit delivers an electronic mail including the converted message to each client, a client user returns a message for the received electronic mail, and a mail server function processing unit delivers a return mail to each client, during which, in a case where a message extraction unit extracts the message extracts a message included in the electronic mail, an annotation creation unit converts the message to an annotation, and an annotation merge unit attaches the converted annotation to a corresponding document.

JP2006-004361A relates to an invention made to provide a document processing apparatus capable of easily confirming an execution schedule of works related to the description contents at a random position in an electronic document, a document processing method and a document processing program, which discloses that a sub-attribute acquisition unit of a client device acquires as a work sub-attribute work instruction information instructing to execute works in a case where an annotation attached to the random position of the electronic document is an instruction to execute the works, a sub-attribute registration unit of an annotation management server registers each annotation corresponding to the work instruction information in a secondary storage unit, and a work execution schedule display control unit of the annotation management server reads the work instruction information from the secondary storage unit at a timing when information indicating an instruction to display a work execution schedule is received from a work execution schedule display instruction unit of the client device, and control a display unit provided in the client device to display the information indicating the work execution schedule instructed by the annotation corresponding to the read work instruction information.

JP2006-018493A relates to an invention made to allow a user to easily understand that information state of a link destination associated with description contents at a random position in an electronic document has changed from a previously referred state, which disclose that a determination unit in a message sharing server refers to message database and sticky-note annotation database, stored in a secondary storage unit, in case where determination instruction information is received from a determination instruction unit, to determine for each user whether or not the information state of the link destination, indicated by link information associated with an annotation attached to the electronic document, is changed since the information has been referred last time, and transmits determination result information indicating determination results; and a display control unit in the client device controls a display unit such that the annotation associated with the link information, as a determination target, is displayed in a different representation state in accordance with the determination results.

SUMMARY

Aspects of non-limiting embodiments of the present disclosure relates to an information processing apparatus and a non-transitory computer readable medium storing an information processing program, which a sticky-note is arranged on a pasteboard, and according to the sticky-note for which a condition and a procedure are set, the procedure is performed for the other sticky-note satisfying such a condition.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a display unit that displays a predetermined region and a sticky-note on a pasteboard; a setting unit that sets a condition for executing a procedure and the procedure on a first sticky-note arranged in the region; and an execution unit that executes the procedure set for the first sticky-note on contents of a second sticky-note arranged outside the region on the pasteboard in a case where the second sticky-note satisfies the condition set for the first sticky-note within the region.

BRIEF DESCRIPTION OF THE DRAWINGS

Exemplary embodiment(s) of the present invention will be described in detail based on the following figures, wherein:

FIG. 2 is a diagram illustrating a configuration example of a system using this exemplary embodiment;

FIG. 4 is a diagram illustrating an example of a data structure of a meeting information table;

FIG. 5 is a diagram illustrating an example of a data structure of a pasteboard information table;

FIG. 6 is a diagram illustrating an example of a data structure of a sticky-note information table;

FIG. 8 is a diagram illustrating an example of a data structure of a legend sticky-note management table;

FIG. 13 is a diagram illustrating an example of a data structure of a Todo management table;

FIG. 15 is a diagram illustrating an example of a data structure of the Todo management table;

DETAILED DESCRIPTION

Hereinafter, exemplary embodiments in realizing the invention will be described with reference to the accompanying drawings.

Figure 1:
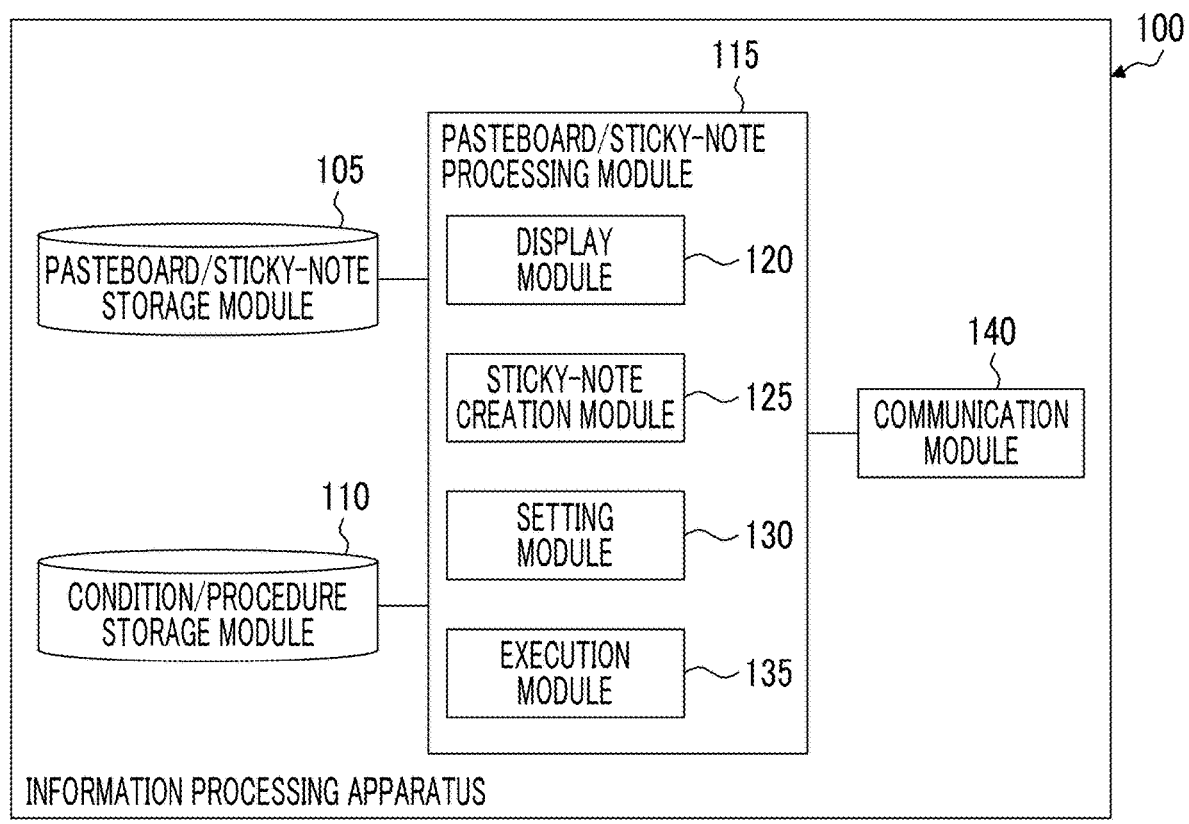
FIG. 1 is a conceptual module configuration diagram illustrating a configuration example according to this exemplary embodiment.

FIG. 1 is a conceptual module configuration diagram illustrating a configuration example according to this exemplary embodiment.

Meanwhile, the term "module" refers to components such as software (including computer programs) and hardware which are typically capable of being logically separated. Consequently, the term "module" in this exemplary embodiment not only refers to modules in a computer program, but also to modules in a hardware configuration. Thus, this exemplary embodiment also serves as a description of a computer program (a program that causes a computer to execute respective operations, a program that causes a computer to function as respective units, or a program that causes a computer to realize respective functions), a system, and a method for inducing functionality as such modules. Meanwhile, although terms like "store" and "record" and their equivalents may be used in the description for the sake of convenience, these terms mean that a storage apparatus is made to store information or that control is applied to cause a storage apparatus to store information in the case where the exemplary embodiment is a computer program. In addition, while modules may be made to correspond with function on a one-to-one basis, some implementations may be configured such that one program constitutes one module, such that one program constitutes multiple modules, or conversely, such that multiple programs constitute one module. Moreover, plural modules may be executed by one computer, but one module may also be executed by plural computers in a distributed or parallel computing environment. Meanwhile, a single module may also contain other modules. In addition, the term "connection" may be used hereinafter to denote logical connections (such as the transmission and reception of data, instructions, a referential relationship between pieces of data, and log-in) in addition to physical connections. The term "predetermined" refers to something being determined prior to the processing in question, and obviously denotes something that is determined before a process according to the exemplary embodiment starts, but may also denote something that is determined after a process according to the exemplary embodiment has started but before the processing in question, according to conditions or states at that time, or according to conditions or states up to that time. In the case of plural "predetermined values", the predetermined values may be respectively different values, or two or more values (this obviously also includes the case of all values) which are the same. Additionally, statements to the effect of "B is conducted in the case of A" are used to denote that a determination is made regarding whether or not "A" holds true, and "B" is conducted in the case where it is determined that "A" holds true. However, this excludes cases where the determination of whether or not "A" holds true may be omitted. Additionally, the case of the listing of things such as "A, B, C" is illustrative listing unless otherwise indicated, and includes a case where only one of them is selected (for example, only "A").

In addition, the terms "system" and "apparatus" not only encompass configurations in which plural computers, hardware, or apparatus are connected by a communication medium such as a network (including connections that support 1-to-1 communication), but also encompass configurations realized by a single computer, hardware, or apparatus. The terms "apparatus" and "system" are used interchangeably. Obviously, the term "system" does not include merely artificially arranged social constructs (social systems).

Also, every time a process is conducted by each module or every time plural processes are conducted within a module, information to be processed is retrieved from a storage apparatus, and the processing results are written back to the storage apparatus after the processing. Consequently, description of the retrieval from a storage apparatus before processing and the writing back to a storage apparatus after processing may be omitted in some cases. Meanwhile, the storage apparatus herein may include hard disks, random access memory (RAM), an external storage medium, storage apparatus accessed via a communication link, and registers, and the like inside a central processing unit (CPU).

An information processing apparatus 100 which is this exemplary embodiment has a function of defining execution of processing for a sticky-note, and includes a pasteboard/sticky-note storage module 105, a condition/procedure storage module 110, a pasteboard/sticky-note processing module 115, and a communication module 140, as illustrated in the example of FIG. 1.

In particular, the information processing apparatus 100 performs the processing related to a pasteboard and a sticky-note, which are used in a meeting. The information processing apparatus 100 encompasses apparatuses called an electronic sticky-note control apparatus, an electronic sticky-note system, an electronic white board, and the like. Further, the sticky-note is also called an electronic sticky-note, an electronic card, and the like.

In addition, the meeting may be any kind of assembly of several people, and encompasses, for example, conference, workshop, brainstorming, council, consultation, discussion, party, session, and the like.

In particular, the information processing apparatus 100 is used in a meeting held by a facilitator (the facilitator is generally one) and a plurality of participants using a sticky-note. The participant creates a sticky-note scribbling, for example, ideas with an electronic sticky-note terminal 250 (corresponding to a participant terminal). In general, examples of the electronic sticky-note terminal 250 include an electronic sticky-note terminal 250A, an electronic sticky-note terminal 250B and the like, each of which is held by each participant (hereinafter, collectively referred to as "electronic sticky-note terminal 250"), as illustrated in the example of FIG. 2. The information processing apparatus 100 receives the sticky-note from the electronic sticky-note terminal 250 and attaches the sticky-note onto the pasteboard (or a background). The facilitator proceeds with the meeting using a shared screen, which is a display device of the information processing apparatus 100, by determining or changing a position of the sticky-note on the pasteboard, clustering the sticky-notes ("clustering the sticky-notes" also corresponds to associating a plurality of the sticky-notes to the other sticky-note, grouping, or the like), and creating the sticky-note information by him/herself. The facilitator falls within a scope of the participants in this exemplary embodiment.

The pasteboard/sticky-note storage module 105 is connected to the pasteboard/sticky-note processing module 115. The pasteboard/sticky-note storage module 105 stores information on the pasteboard and the sticky-note. The pasteboard/sticky-note storage module 105 is accessed by each module in the pasteboard/sticky-note processing module 115 and provides writing functions including reading, correction and deletion of the information on the pasteboard and the sticky-note.

The condition/procedure storage module 110 is connected to the pasteboard/sticky-note processing module 115. The condition/procedure storage module 110 stores a condition for executing a procedure and the procedure, which are set for the sticky-note. The condition/procedure storage module 110 is accessed by each module in the pasteboard/sticky-note processing module 115 and provides writing functions including reading, correction and deletion of the information on the condition and the procedure.

The pasteboard/sticky-note processing module 115 includes a display module 120, a sticky-note creation module 125, a setting module 130, and an execution module 135, and is connected to the pasteboard/sticky-note storage module 105, the condition/procedure storage module 110 and the communication module 140. The pasteboard/sticky-note processing module 115 performs the processing related to the pasteboard and the sticky-note. As the processing related to the sticky-note, for example, the procedure associated with the sticky-note is executed, in addition to the processing on the pasteboard, such as creating and pasting the sticky-note.

The display module 120 displays the pasteboard and the sticky-note attached onto the pasteboard on a screen. Further, the display module 120 displays a predetermined region on the pasteboard. For example, a legend region to which a legend sticky-note is attached corresponds to the "predetermined region".

The sticky-note creation module 125 creates the sticky-note in accordance with the information transmitted from a user's operation or the electronic sticky-note terminal 250.

Moreover, the sticky-note creation module 125 may create a new second sticky-note by copying the first sticky-note within the region to the outside of the region.

The setting module 130 sets the condition for executing the procedure and the procedure for the first sticky-note arranged within the region. The first sticky-note may be a sticky-note indicating a legend. The setting may be performed in accordance with the user's operation, or may be performed to set a predetermined condition and a predetermined procedure, such as initial setting. As the condition or the procedure, for example, a rule engine such as RPA (Robotic Process Automation) or the like may be used. At this time, the setting module 130 may connect to the RPA using an API for connecting to the RPA.

In a case where the second sticky-note arranged outside the region on the pasteboard satisfies the condition set for the first sticky-note within the region, the execution module 135 executes the procedure set for the first sticky-note on contents of the second sticky-note. The second sticky-note is a sticky-note attached onto the pasteboard, and is a sticky-note other than the first sticky-note. In particular, the second sticky-note is a sticky-note generally used at the meeting. Hereinafter, in a case of being exemplified, it is also referred to as a general sticky-note.

The communication module 140 transmits the contents of the second sticky-note to an external device in a case of where "transmitting information to the external device" is set as the procedure.

Further, the setting module 130 may set a representation form of the sticky-note.

In a case where a representation form of the second sticky-note matches a representation form of the first sticky-note, the execution module 135 may execute the procedure set for the first sticky-note on the contents of the second sticky-note.

The setting module 130 may set to output the contents of the second sticky-note to another information processing apparatus as the procedure.

The execution module 135 may output the contents of the second sticky-note to another information processing apparatus via the communication module 140. The "other information processing apparatus" may be, for example, a cooperative information processing apparatus 290 described later with reference to FIG. 2.

Further, the setting module 130 may set to output data to another information processing apparatus as items described in the first sticky-note, as the procedure.

The execution module 135 may output contents of a grouped second sticky-note cluster, as one set, to another information processing apparatus.

The term "item" refers to a time in a data structure, for example, an item in a table-type data structure. In particular, for table-type data having a person in charge and Todo (the term "Todo" indicates "things what must have to be done", the contents of the sticky-note corresponding to the condition of "person in charge" is input in the item of "person in charge", and the contents of the sticky-note corresponding to the condition of "Todo" is input in the item of "Todo".

The term "grouped second sticky-note cluster" means associating a plurality of sticky-notes with each other; for example, a plurality of sticky-notes within the region surrounded by the user's operation are clustered as one group.

Further, the sticky-note creation module 125 may create a second sticky-note satisfying the condition set for the first sticky-note that is a copy source.

The execution module 135 executes the procedure set for the first sticky-note that is the copy source on contents described in the second sticky-note created by the sticky-note creation module 125.

FIG. 2 is a diagram illustrating a configuration example of a system using this exemplary embodiment. The information processing apparatus 100 generally includes a large screen display device, which is operated by the facilitator. This display device is controlled by the display module 120 and is visible to all participants. Each electronic sticky-note terminal 250 is operated by the participants in the meeting. Generally, each participant holds his/her own terminal. For example, a tablet terminal is used as the electronic sticky-note terminal 250.

In the example of FIG. 2, a conference room 280A is provided with an information processing apparatus 100A, an electronic sticky-note terminal 250A, an electronic sticky-note terminal 250B, and an electronic sticky-note terminal 250C, in which the meeting is held. The information processing apparatus 100A, the electronic sticky-note terminal 250A, the electronic sticky-note terminal 250B, and the electronic sticky-note terminal 250C are connected to each other via a communication link 298. The communication link 298 may be, for example, a wireless line, a wired line, or a combination thereof, and may be, for example, internet or intranet, as a communication infrastructure, or the like.

Further, a conference room 280B is provided with an information processing apparatus 100B, an electronic sticky-note terminal 250D, and an electronic sticky-note terminal 250E, in which the meeting different from that held in the conference room 280A is held. The information processing apparatus 100B, the electronic sticky-note terminal 250D, and the electronic sticky-note terminal 250E are connected to each other via the communication link 298.

A user terminal 210A, a user terminal 210B, a cooperative information processing apparatus 290, a pasteboard/sticky-note storage device 294, the devices in the conference room 280A, and the devices in the conference room 280B are connected to each other via a communication link 299. The communication link 299 may be, for example, a wireless line, a wired line, or a combination thereof, and may be, for example, internet or intranet, as a communication infrastructure, or the like. Further, the functions of the cooperative information processing apparatus 290 and the pasteboard/sticky-note storage device 294 may be realized as a cloud service.

The cooperative information processing apparatus 290 cooperates with the information processing apparatus 100 to perform the processing. As described above, the cooperative information processing apparatus 290 may be an RPA server for performing RPA processing. In this case, instance of a robot may hold a correspondence table permanently. As a matter of course, the function of the cooperative information processing apparatus 290 may be realized as a cloud service. Interrelation can be established between different services by using the RPA server, thus the systems can be synchronized.

Further, the cooperative information processing apparatus 290 may also function as, for example, a Todo management device. That is, the cooperative information processing apparatus 290 may receive information described in the sticky-note created by the information processing apparatus 100 as the Todo information and register the information processing apparatus in a Todo list. Each information processing apparatus 100 may perform the processing using the cooperative information processing apparatus 290. In this case, the Todo list in the cooperative information processing apparatus 290 may be shared by a plurality of information processing apparatuses 100. That is, the Todo list managed by the information processing apparatus 100A may be used by the information processing apparatus 100B.

The pasteboard/sticky-note storage device 294 stores information on the pasteboard and the sticky-note. Each information processing apparatus 100 may perform the processing using the pasteboard/sticky-note storage device 294. In this case, the information on the pasteboard and the sticky-note, stored in the pasteboard/sticky-note storage device 294, may be shared by a plurality of information processing apparatuses 100. That is, the information on the pasteboard and the sticky-note, managed by the information processing apparatus 100A, may be used by the information processing apparatus 100B.

Further, the user terminal 210 is used by the participants of the meeting, which creates his/her own Todo items, or assigns the contents of the sticky-note created at the meeting to his/her own Todo items. Moreover, the participant operates the user terminal 210 to register the progress of the Todo items in the cooperative information processing apparatus 290.

Figure 3A:
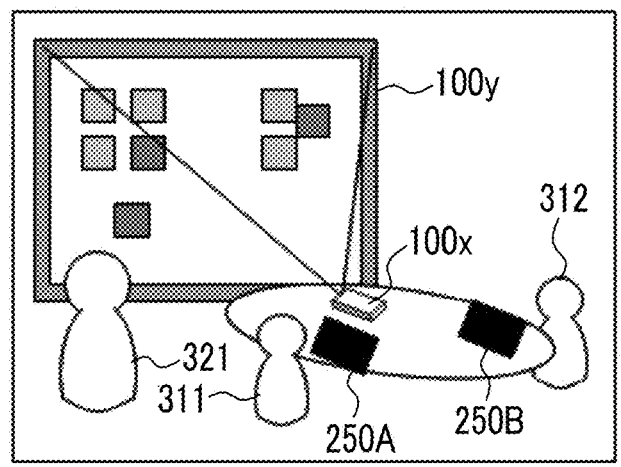
FIGS. 3A to 3C are diagrams illustrating a use example of an electronic sticky-note terminal and an information processing apparatus in a conference room using this exemplary embodiment.
Figure 3B:
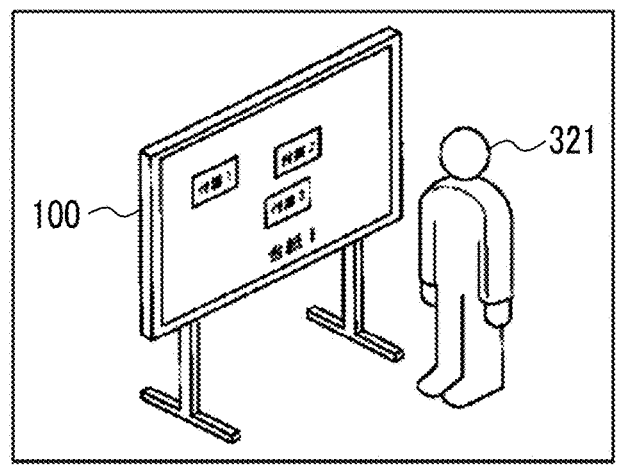
Figure 3C:
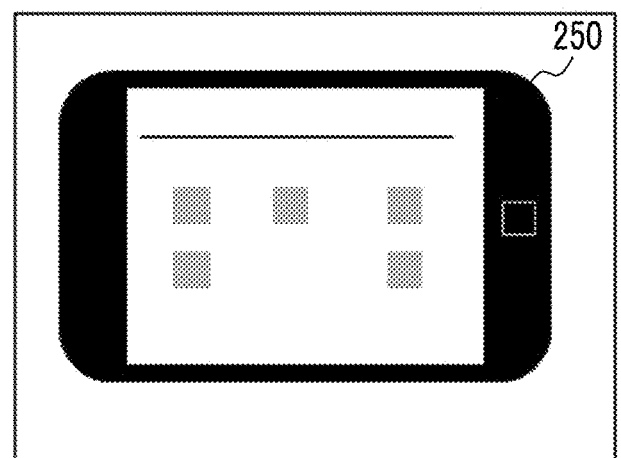

FIGS. 3A to 3C are diagrams illustrating a use example of the electronic sticky-note terminal 250 and the information processing apparatus 100 in the conference room. 280 using this exemplary embodiment.

Participants 311 and 312, and a facilitator 321 are gathered in the conference room as illustrated in the example of FIG. 3A. The participant 311 uses the electronic sticky-note terminal 250A, and the participant 312 uses the electronic sticky-note terminal 250B. Generally, one electronic sticky-note terminal 250 is assigned to one participant. As the electronic sticky-note terminal 250 illustrated in the example of FIG. 3C, the electronic sticky-note terminal 250 is a tablet terminal with a size of a notebook (for example, A4, B5, 7 to 10 inches, etc.), which is operated using a finger, a pen, or the like. The participant creates the sticky-note information describing text data, handwritten characters, figures, and the like. The terminal device is not limited to a tablet terminal, and may be a PC (including a notebook PC) or the like, which is provided with a keyboard, a mouse, and the like.

An information processing apparatus 100x is a projector, which displays the pasteboard and the sticky-note, as illustrated in the example of FIG. 3A. Further, an information processing apparatus 100y is an electronic white board, and detects the movement of the finger or the pen of the facilitator 321 to accept operations such as attaching the sticky-note to the pasteboard, moving the sticky-note, grouping the sticky-notes, or the like. For example, the information processing apparatus 100y is equipped with a pen. By detecting that the pen has left a predetermined pen holder (in particular, the facilitator 321 has lifted the pen to operate) and detecting a position of a tip (in particular, the tip of the pen has touched the information processing apparatus 100y or the like), the operation on the pasteboard and the sticky-note is accepted. For example, the pen holder is usable as long as it is provided with a sensor (in particular, a sensor that switches on and off by gravity of the pen, etc.) and detects which pen is used out of a plurality of pens (in particular, a black pen, a red pen, a blue pen, etc.). Further, the whole display screen of the information processing apparatus 100y may be a touch sensor, and a position and pressure at which the display screen is touched may be detected. In this example, on/off of the pen is controlled by the pen holder; however, the pen holder does not have to be provided. On/off of the pen may be controlled directly on a pen side. For changing colors, a color palette may be prepared on a part of the display screen without the pen holder in order to change colors by touching a desired color with the finger or the pen. Alternatively, the pen is provided with a function for instructing to change colors (in particular, a button, a slider or the like for executing such a function).

The information processing apparatus 100 may be an electronic board as illustrated in the example of FIG. 3B. The electronic board generally has a large screen display device (at least larger than a display device of the electronic sticky-note terminal 250). Such a display device is a touch panel, and detects a position and pressure at which the display screen is touched. For example, the screen may have a size of around 80 inches.

FIG. 4 is a diagram illustrating an example of a data structure of a meeting information table 400. The meeting information table 400 is stored in the pasteboard/sticky-note storage module 105. The meeting information table 400 includes a meeting ID field 410, a meeting name field 415, a date-and-time field 420, a pasteboard ID field 425, a participant number field 430, and a participant ID field 435. In this exemplary embodiment, the meeting ID field 410 stores information (in particular, meeting ID: identification) for uniquely identifying the meeting. The meeting name field 415 stores a name of the meeting. The date-and-time field 420 stores date and time at when the meeting is held (the term "date and time" may include year, month, day, hour, minute, second, millisecond, or a combination thereof), or a period during the meeting is held (the term "period" may include two dates and times, such as start date and end date of the meeting). In this exemplary embodiment, the pasteboard ID field 425 stores information (in particular, pasteboard ID) for uniquely identifying the pasteboard used at the meeting. The participant number field 430 stores the number of participants in the meeting. In this exemplary embodiment, the participant ID field 435 stores information (in particular, a list of participant IDs) for uniquely identifying the participant.

FIG. 5 is a diagram illustrating an example of a data structure of a pasteboard information table 500. The pasteboard information table 500 is stored in the pasteboard/sticky-note storage module 105. The pasteboard information table 500 includes a pasteboard ID field 510, a pasteboard pattern ID field 515, a creation date field 520, and a creator field 525. The pasteboard ID field 510 stores a pasteboard ID. The pasteboard pattern ID field 515 stores a pasteboard pattern ID of a pasteboard pattern serving as a background. For example, examples of the pasteboard pattern include a blank pattern, a table pattern, and the like. Further, a pasteboard pattern for Todo management may be used as the pasteboard pattern. In particular, the pasteboard pattern may be a pasteboard pattern in which the legend region is drawn, or may be a pasteboard pattern to which the predetermined sticky-note is attached within the legend region as described later. The creation date field 520 stores a date and a time at which the pasteboard is created. The creator field 525 stores a creator who creates the pasteboard.

FIG. 6 is a diagram illustrating an example of a data structure of a sticky-note information table 600. The sticky-note information table 600 is stored in the pasteboard/sticky-note storage module 105. The sticky-note information table 600 includes a sticky-note ID field 610, a pasteboard ID field 615, an attachment position field 620, a size field 625, a creation date field 630, a creator field 635, an attachment date field 640, a color field 645, a frame shape field 650, a frame color field 655, a frame thickness field 660, an in-group field 665, a type field 670, a content type field 675, and a content field 680. The sticky-note ID field 610 stores a sticky-note ID of a sticky-note. The pasteboard ID field 615 stores a pasteboard ID of a pasteboard to which the sticky-note is attached. The attachment position field 620 stores a position at which the sticky-note is attached. In other words, the attachment position field 620 stores a position at which the sticky-note is attached on the pasteboard. For example, the position is indicated by coordinates of the pasteboard in the XY coordinate system (for example, a center, an upper left end, or the like of the sticky-note). The size field 625 stores a size of the sticky-note. For example, in a case where the sticky-note to be presented is a rectangle, the size field 625 stores a width and a height of the sticky-note. The creation date field 630 stores a date and a time at which the sticky-note is created. The creator field 635 stores a creator who creates the sticky-note. Alternatively, the information processing apparatus (for example, a device ID of the electronic sticky-note terminal 250 or the information processing apparatus 100) by which the sticky-note is created may be stored. The attachment date field 640 stores a date and a time at which the sticky-note is attached to the pasteboard. The color field 645 stores a display color of the sticky-note. The frame shape field 650 stores a shape (for example, a solid line, a dotted line, a broken line, a wavy line, a double line, or the like) of a frame used for displaying the sticky-note. The frame color field 655 stores a color of the frame used for displaying the sticky-note. The frame thickness field 660 stores a thickness of the frame used for displaying the sticky-note. The in-group field 665 stores information on a group to which the sticky-note belongs. For example, the in-group field 655 may store information indicating whether the sticky-note belongs to a group or not, and in a case where the sticky-note belongs to a group, the in-group field 655 may store a group ID and IDs of the other sticky-notes belonging to such a group. The type field 670 stores a type of the sticky-note. In particular, examples of the type include a type indicating that the sticky-note is a legend sticky-note, which is a specific example of the first sticky-note, a type indicating that the sticky-note is a general sticky-note, which is a specific example of the second sticky-note, and the like. The content type field 675 stores a content type of the sticky-note (for example, text information, vector data indicating handwritten characters or graphics, audio information, still image information such as photographs, movie information, or a combination thereof). The content field 680 stores contents written in the sticky-note.

Figure 7:
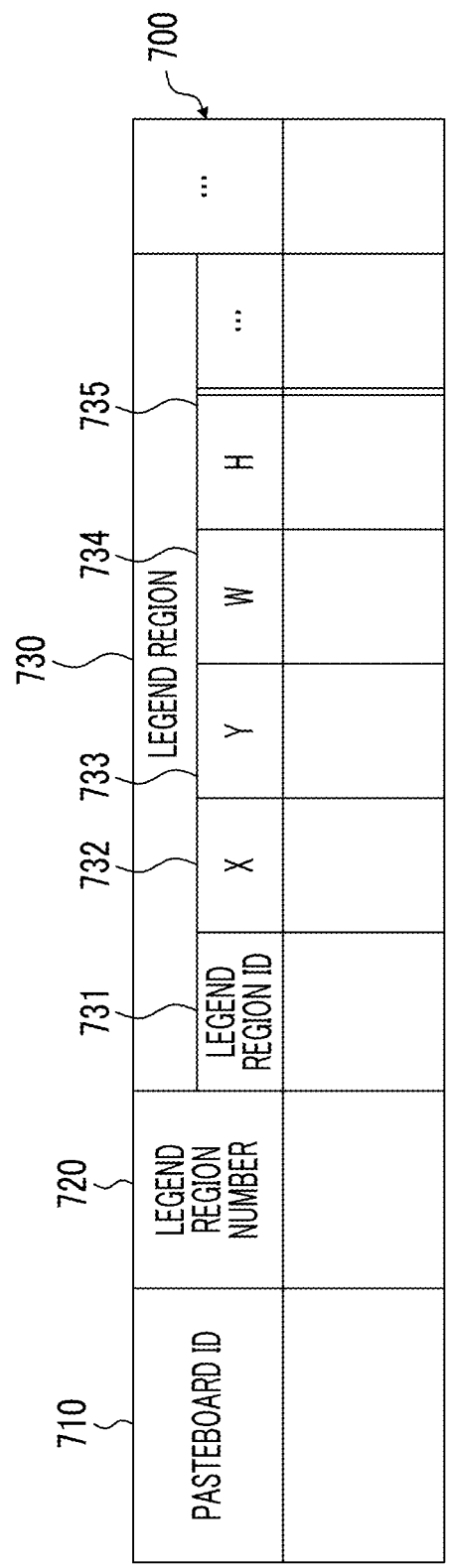
FIG. 7 is a diagram illustrating an example of a data structure of a legend region management table.

FIG. 7 is a diagram illustrating an example of a data structure of a legend region management table 700.

The legend region management table 700 includes a pasteboard ID field 710, a legend region number field 720, and a legend region field 730. The legend region field 730 includes a legend region ID field 731, an X field 732, a Y field 733, a W field 734, and an H field 735. The legend region management table 700 is stored in the pasteboard/sticky-note storage module 105. The pasteboard ID field 710 stores a pasteboard ID. The legend region number field 720 stores the number of legend regions drawn within the pasteboard. The legend region field 730 stores a legend region. The legend region field 730 has field groups including from the legend region ID field 731 to the H field 735. The number of field groups are as many as the number of legend regions stored in the legend region number field 720. In this exemplary embodiment, the legend region ID field 731 stores information (in particular, legend region ID) for uniquely identifying the legend region. The X field 732 stores an X coordinate of the legend region. The Y field 733 stores a Y coordinate of the legend region. The W field 734 stores a W value (that is, a width of the region) of the legend region. The H field 735 stores an H value (that is, a height of the region) of the legend region.

FIG. 8 is a diagram illustrating an example of a data structure of a legend sticky-note management table 800.

The legend sticky-note management table 800 includes a legend sticky-note ID field 810, a legend region ID field 820, a condition field 830, and a procedure field 840. The legend sticky-note management table 800 is stored in the condition/procedure storage module 110. In this exemplary embodiment, the legend sticky-note ID field 810 stores information (in particular, legend sticky-note ID) for uniquely identifying the legend sticky-note. The legend region ID field 820 stores a legend region ID of a legend region to which the legend sticky-note is attached. The condition field 830 stores a condition for the legend sticky-note. The procedure field 840 stores a procedure to be executed in a case where the condition is satisfied.

Figure 9:
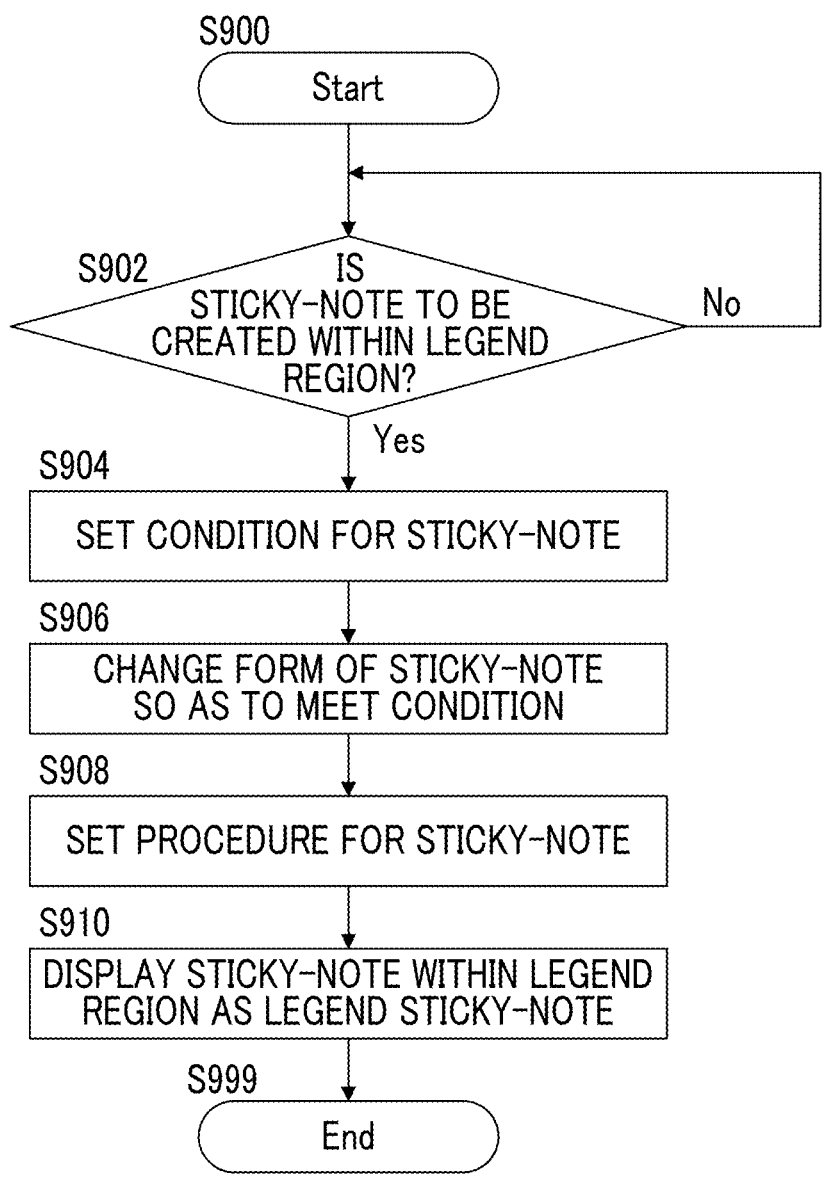
FIG. 9 is a flowchart illustrating a processing example of this exemplary embodiment.

FIG. 9 is a flowchart illustrating a processing example of this exemplary embodiment.

In step S902, it is determined whether or not the sticky-note is to be created within the legend region. In a case where the sticky-note is to be created, the processing proceeds to step S904, and otherwise, the processing ceases until the sticky-note is created. The determination is made, for example, by detecting whether or not the sticky-note is attached within the legend region.

In step S904, the condition is set for the sticky-note. For example, the condition is set for the sticky-note within the legend region by the user's operation. Further, the predetermined condition may be set. In particular, a form of the sticky-note may be set as the condition. For example, the condition may be that the sticky-note is blue.

In step S906, the form of the sticky-note is changed so as to meet the condition. For example, as described above, in a case where the condition is set that the sticky-note is blue, the sticky-note is changed to be blue.

In step S908, the procedure is set for the sticky-note. For example, the procedure is set for the sticky-note within the legend region by the user's operation. Further, the predetermined procedure may be set. In particular, the procedure may be that, for example, the sticky-note is output as a person-in-charge item of a database. In a case where the blue sticky-note is created to match the condition stated above, the contents (in particular, a name of the person in charge) of the blue sticky-note is output to the person-in-charge item of the database.

In step S910, the sticky-note is displayed within the legend region as the legend sticky-note. For example, the blue sticky-note is displayed within the legend region.

Figure 10:
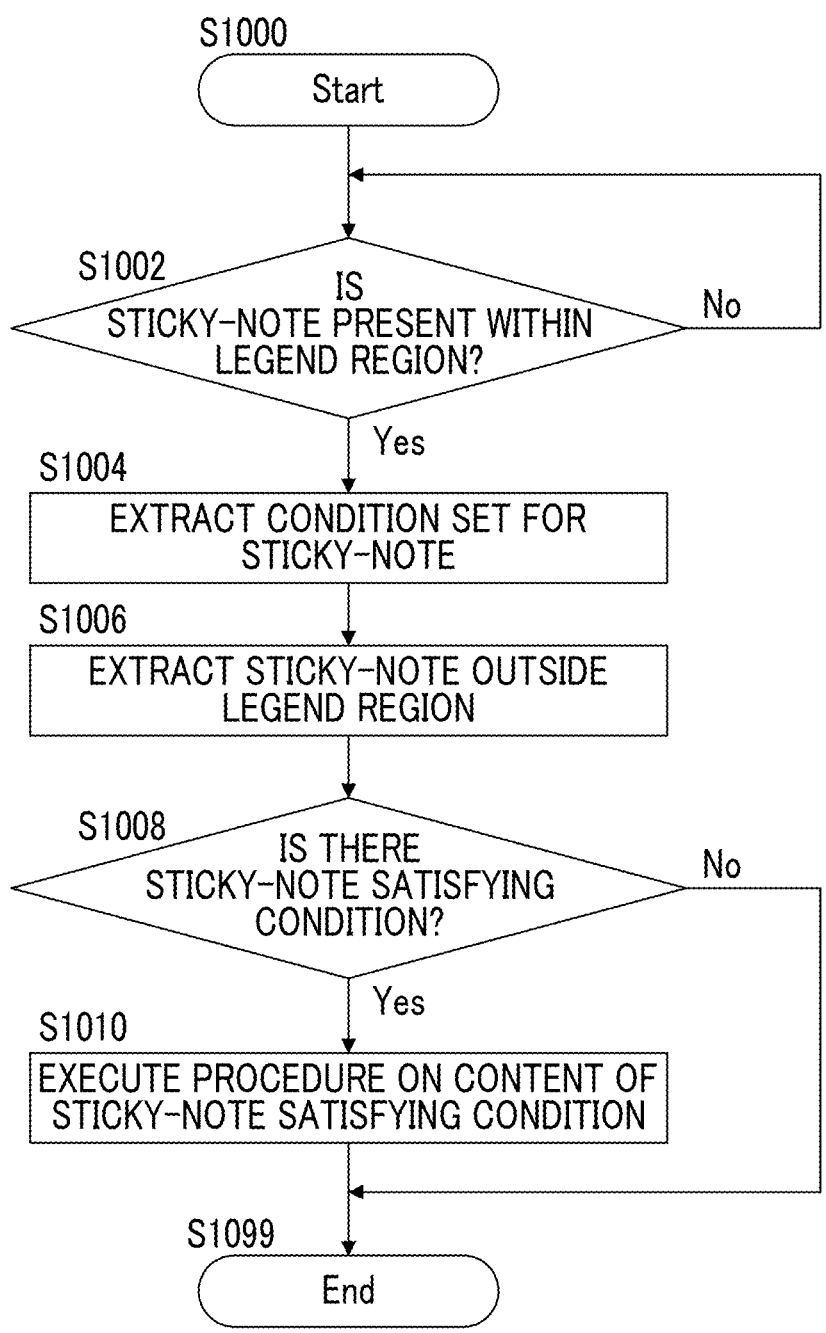
FIG. 10 is a flowchart illustrating a processing example of this exemplary embodiment.

FIG. 10 is a flowchart illustrating a processing example of this exemplary embodiment.

In step S1002, it is determined whether or not the sticky-note is present within the legend region. In a case where the sticky-note is present within the legend region, the processing proceeds to step S1004, and otherwise, the processing ceases until the sticky-note appears.

In step S1004, the condition set for the sticky-note is extracted.

In step S1006, the sticky-note outside the legend region is extracted. In other words, the general sticky-note is extracted as a target.

In step S1008, it is determined whether or not there is the sticky-note satisfying the condition. In a case where there is the sticky-note satisfying the condition, the processing proceeds to step S1010, and otherwise, the processing ends (step S1099). For example, it is determined whether or not the sticky-note is a blue general sticky-note as illustrated in the example of FIG. 9. In particular, it may be determined based on the contents of the color field 645 of the sticky-note information table 600.

In step S1010, the procedure is executed on the contents of the sticky-note satisfying the condition. For example, the contents (in particular, a name of the person in charge) of the blue general sticky-note is output to the person-in-charge item of the database as illustrated in the example of FIG. 9.

Figure 11:
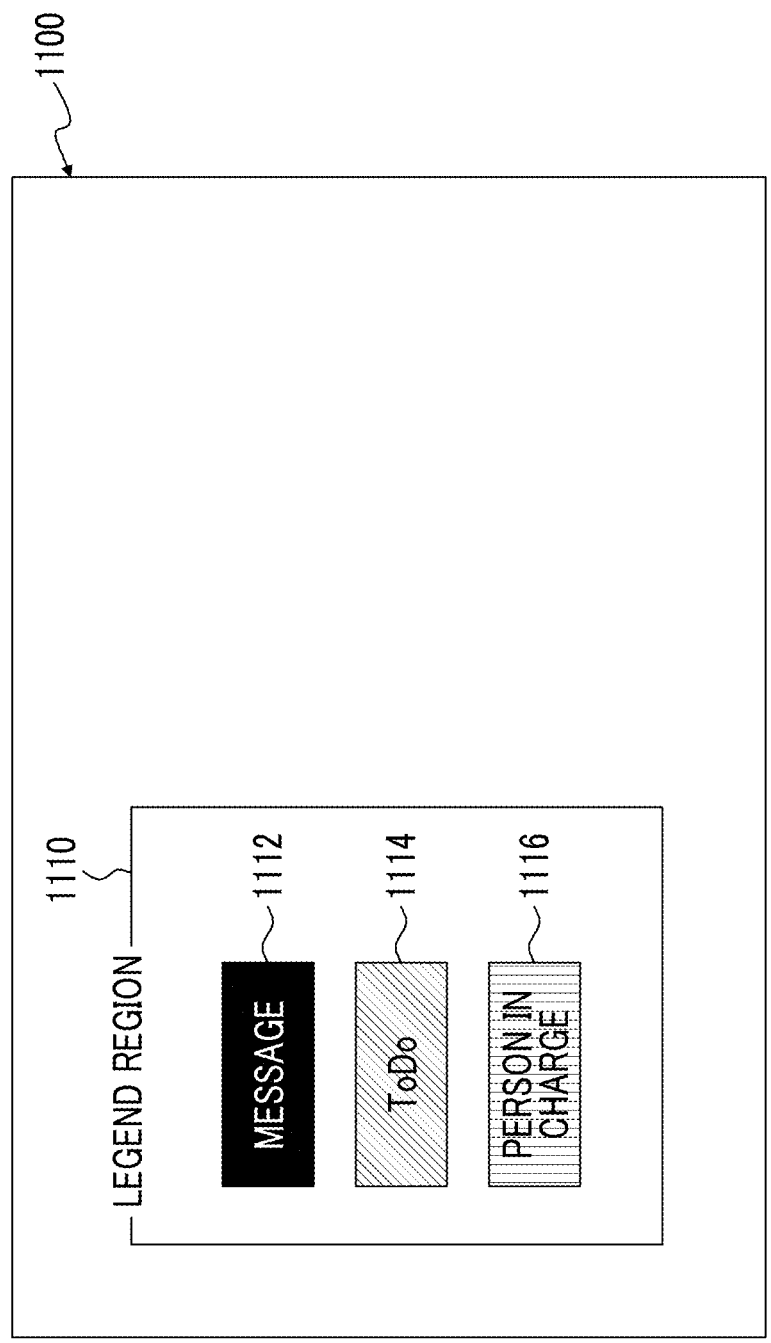
FIG. 11 is a diagram illustrating a processing example of this exemplary embodiment.

FIG. 11 is a flowchart illustrating a processing example of this exemplary embodiment.

For example, a legend region 1110 is displayed on a pasteboard 1100. For example, a legend sticky-note 1112, a legend sticky-note 1114, and a legend sticky-note 1116 are displayed within the legend region 1110. The legend sticky-note 1112 is yellow, which is a legend sticky-note described as a message. The legend sticky-note 1114 is pink, which is a legend sticky-note described as Todo. The legend sticky-note 1116 is blue, which is a legend sticky-note described as a person in charge. The condition set for the legend sticky-note 1112 is that "the sticky-note has yellow color", and the procedure set for the legend sticky-note 1112 is that "the sticky-note is output to a message field of the database". In other words, the contents described in the general sticky-note that is yellow is output to the message field of the database. The condition set for the legend sticky-note 1114 is that "the sticky-note has pink color", and the procedure set for the legend sticky-note 1114 is that "the sticky-note is output to a Todo field of the database". In other words, the contents described in the general sticky-note that is pink is output to the Todo field of the database. The condition set for the legend sticky-note 1116 is that "the sticky-note has blue color", and the procedure set for the legend sticky-note 1116 is that "the sticky-note is output to a person-in-charge field of the database". In other words, the contents described in the general sticky-note that is blue is output to the person-in-charge field of the database.

Figure 12:
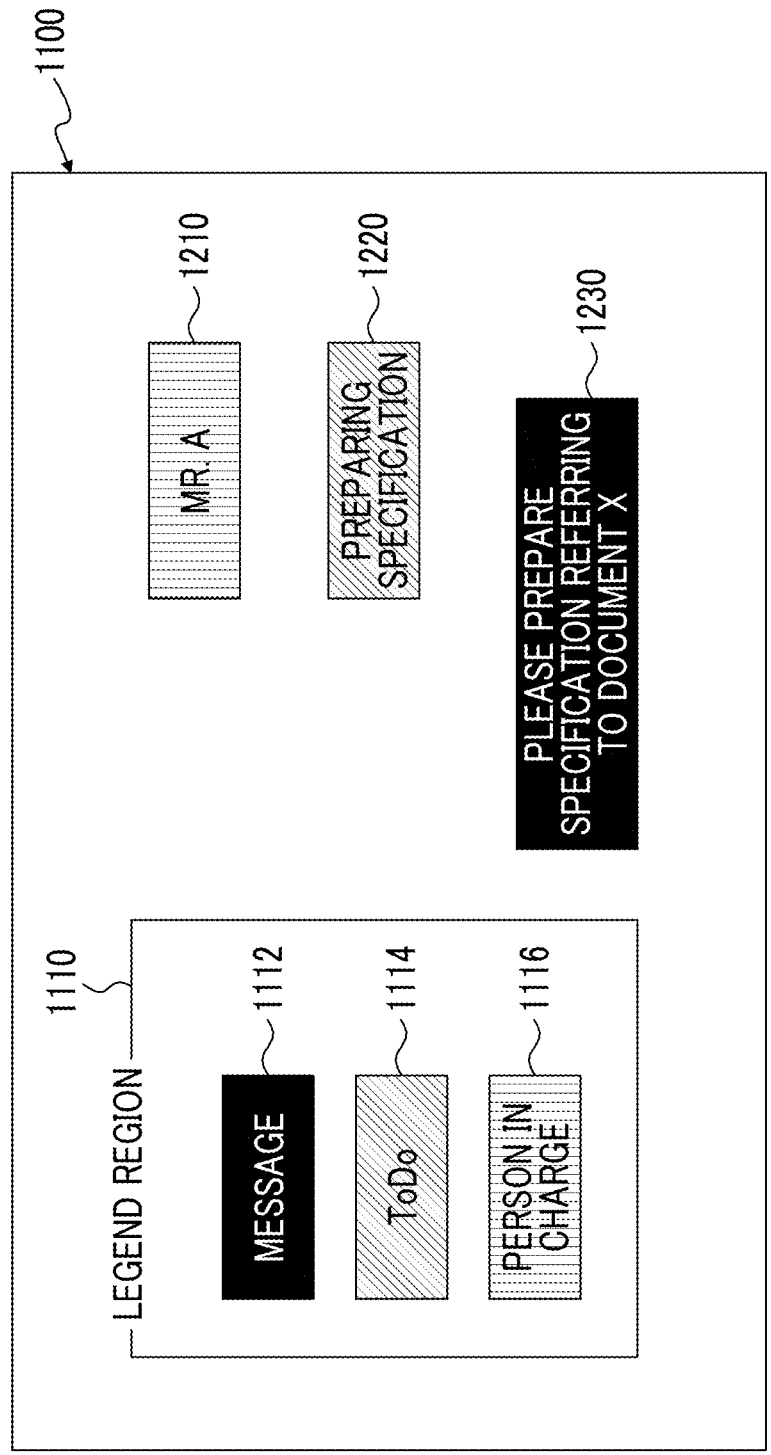
FIG. 12 is a diagram illustrating a processing example of this exemplary embodiment.

FIG. 12 is a diagram illustrating a processing example of this exemplary embodiment.

For example, the legend region 1110 is displayed on the pasteboard 1100, to which a sticky-note 1210, a sticky-note 1220 and a sticky-note 1230 are attached. Similar to the example of FIG. 11, the legend sticky-note 1112, the legend sticky-note 1114, and the legend sticky-note 1116 are displayed within the legend region 1110. For example, the sticky-note 1210 is blue and recites "Mr. A". The sticky-note 1220 is pink and recites "preparing specification". The sticky-note 1230 is yellow and recites "Please prepare specification referring to document X".

The sticky-note 1210 is blue, thus it matches the condition of the legend sticky-note 1116. The sticky-note 1220 is pink, thus it matches the condition of the legend sticky-note 1114. The sticky-note 1230 is yellow, thus it matches the condition of the legend sticky-note 1112. A Todo management table 1300 is created by executing each of the procedures. The procedure is executed in a case where the condition is satisfied. Therefore, the other factors, such as a position at which the general sticky-note is attached or a creation order of the general sticky-notes, are irrelevant unless those factors are set as the condition.

FIG. 13 is a diagram illustrating an example of a data structure of the Todo management table 1300. The Todo management table 1300 includes a person-in-charge field 1310, a Todo field 1320, and a message field 1330. The person-in-charge field 1310 stores a person in charge. The Todo field 1320 stores Todo. The message field 1330 stores a message. By executing the procedure of the legend sticky-note for the general sticky-note illustrated in FIG. 12, "Mr. A" is output to the person-in-charge field 1310, "preparing specification" is output to the Todo field 1320, and "Please prepare specification referring to document X" is output to the message field 1330. In other words, the person in charge, that is, Mr. A's Todo is "preparing specification, the message shall be "prepared[d] referring to document X".

Figure 14:
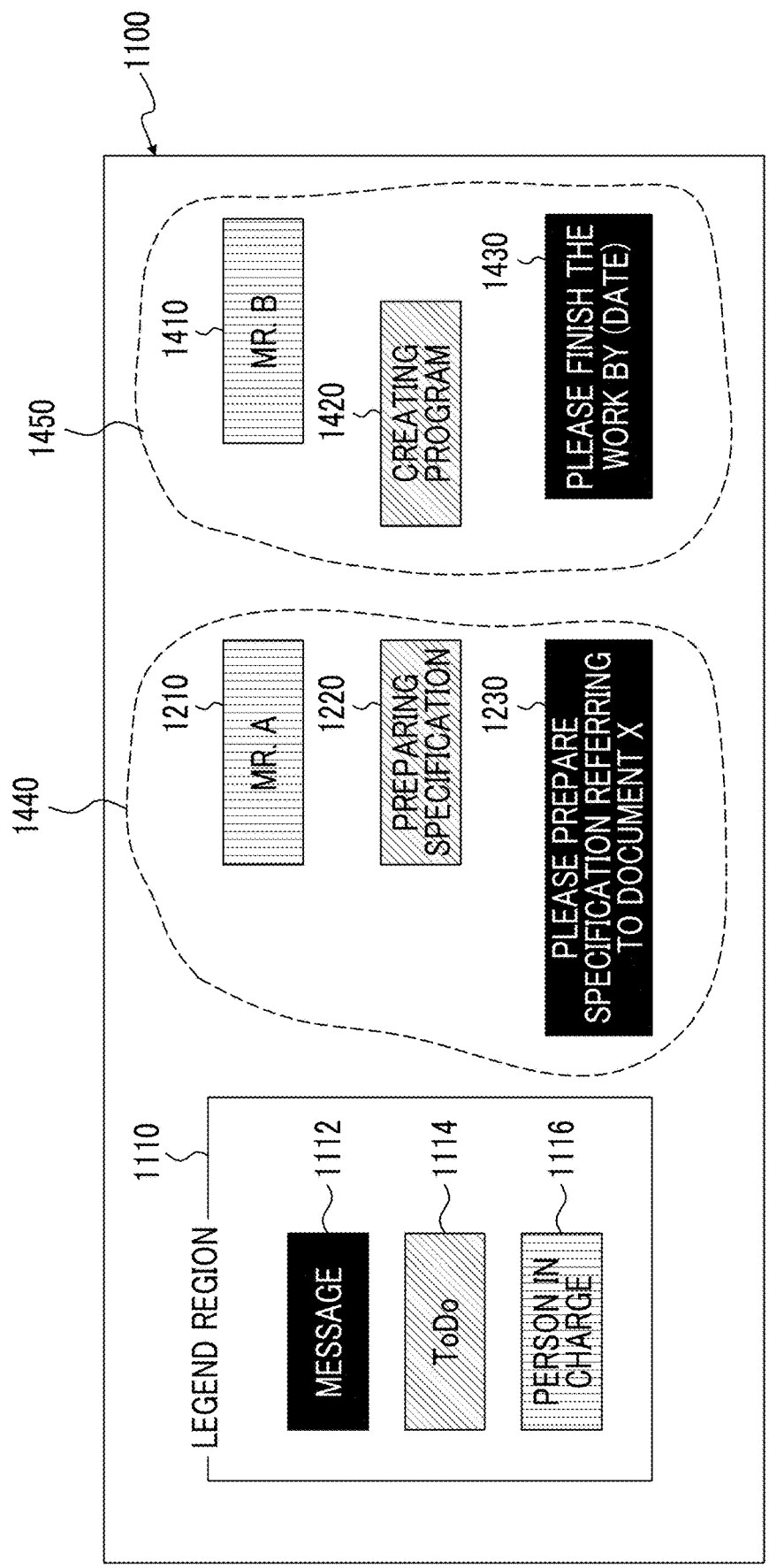
FIG. 14 is a diagram illustrating a processing example of this exemplary embodiment.

FIG. 14 is a diagram illustrating a processing example of this exemplary embodiment.

For example, the legend region 1110, the sticky-note 1210, the sticky-note 1220, the sticky-note 1230, a sticky-note 1410, a sticky-note 1420, and a sticky-note 1430 are displayed on the pasteboard 1100. The sticky-note 1410, the sticky-note 1420 and the sticky-note 1430 are added to the example of FIG. 12. The sticky-note 1410 is blue and recites "Mr. B". The sticky-note 1420 is pink and recites "creating program". The sticky-note 1430 is yellow and recites "Please finish the work by (date)".

The sticky-note 1210, the sticky-note 1220, and the sticky-note 1230 are grouped, while the sticky-note 1410, the sticky-note 1420, and the sticky-note 1430 are grouped. In particular, lines in particular a group 1440 and a group 1450 are drawn by the user's operation. Consequently, the group 1440 encompasses the sticky-note 1210, the sticky-note 1220, and the sticky-note 1230. The group 1450 encompasses the sticky-note 1410, the sticky-note 1420, and the sticky-note 1430.

These groups are output. In particular, the groups are output as a related data cluster of the database. In other words, a Todo management table 1500 is created by executing each procedure within the legend region 1110 for each group.

FIG. 15 is a diagram illustrating an example of a data structure of the Todo management table 1500. The Todo management table 1500 includes a Todo ID field 1505, a person-in-charge field 1510, a Todo field 1520, and a message field 1530. In this exemplary embodiment, the Todo ID field 1505 stores information (in particular, Todo ID) for uniquely identifying the Todo. The person-in-charge field 1510 stores a person in charge. The Todo field 1520 stores Todo. The message field 1530 stores a message. In other words, the Todo management table 1500 is created by adding the Todo ID field 1505 to the Todo management table 1300.

This Todo management table 1500 is created by the example of FIG. 14. For example, the procedure is executed for the sticky-note in the group 1440, and a first row of the Todo management table 1500 is created. That is, Todo ID: 1 indicates that the person in charge is "Mr. A", Todo is "preparing specification", and the message is that "Please prepare specification referring to document X". The procedure is executed for the sticky-note in the group 1450, and a second row of the Todo management table 1500 is created. That is, Todo ID: 1 indicates that the person in charge is "Mr. B", Todo is "creating program", and the message is that "Please finish the work by (date)".

Figure 16:
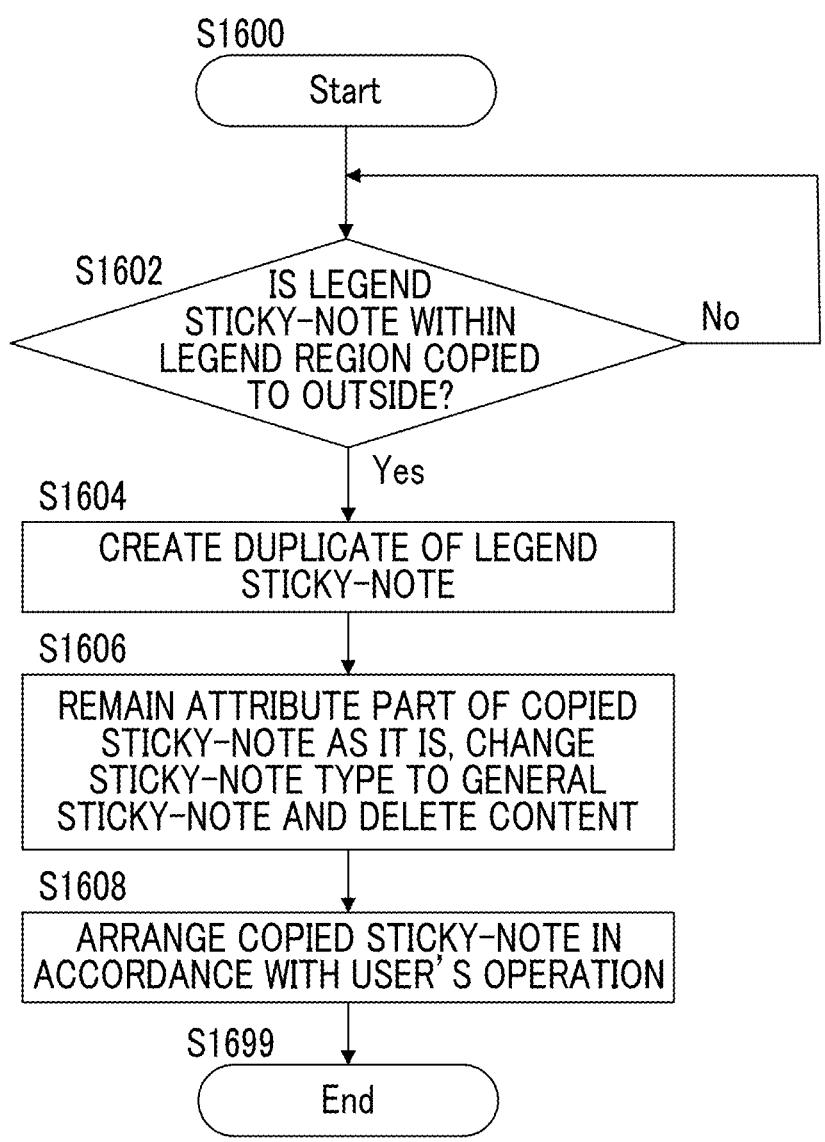
FIG. 16 is a flowchart illustrating a processing example of this exemplary embodiment.

FIG. 16 is a flowchart illustrating a processing example of this exemplary embodiment. This processing example is that the general sticky-note satisfying the condition set for the legend sticky-note can be created by copying the legend sticky-note. That is, the user can create the sticky-note satisfying the condition without performing an operation of changing the attribute of the sticky-note.

In step S1602, it is determined whether or not the legend sticky-note within the legend region is copied to the outside by the user's operation. In a case where the legend sticky-note is copied, the processing proceeds to step S1604, and otherwise, the processing ceases until the legend sticky-note is created.

In step S1604, a duplicate of the legend sticky-note is created.

In step S1606, an attribute part of the copied sticky-note remains as it is, the sticky-note type is changed to the general sticky-note, and the contents are deleted. For example, the attribute part related to the form may be copied as it is. In particular, the attribute part related to the form corresponds to the color field 645, the frame shape field 650, the frame color field 655, and the frame thickness field 660 of the sticky-note information table 600. The type field 670 is changed to the general sticky-note, and the content field 680 is blank.

In step S1608, the copied sticky-note is arranged in accordance with the user's operation.

Figure 17:
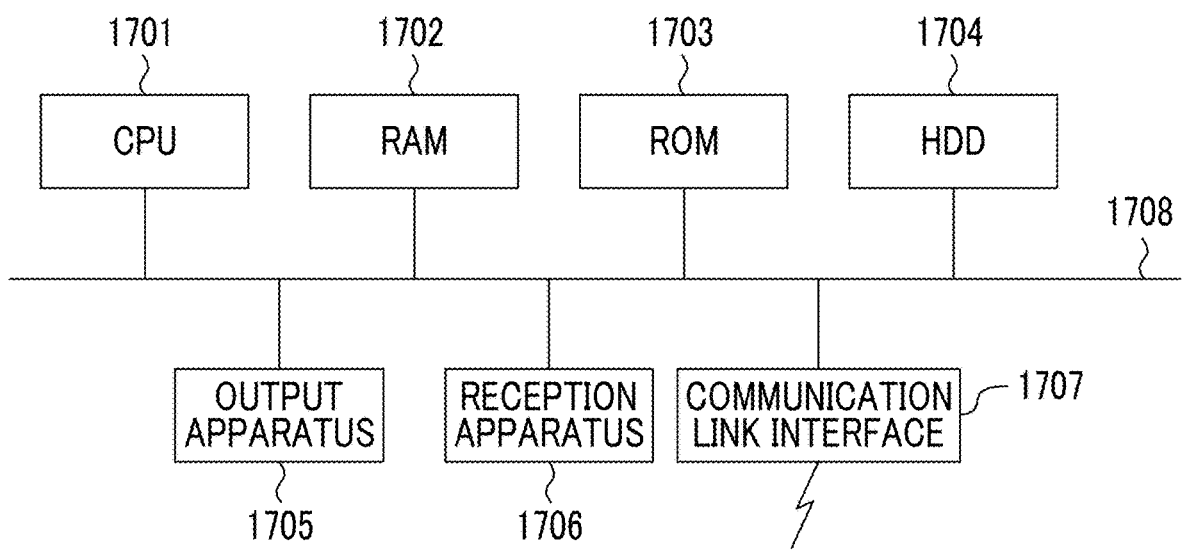
FIG. 17 is a block diagram illustrating a hardware configuration example of a computer for realizing this exemplary embodiment.

Meanwhile, a hardware configuration of a computer executing a program as this exemplary embodiment is a general computer as illustrated in FIG. 17, and specifically, is a personal computer, a computer that may serve as a server, or the like. That is, as a specific example, a CPU 1701 is used as a processing unit (computational unit), and a RAM 1702, a ROM 1703, and an HDD 1704 are used as storage devices. As the HDD 1704, for example, a Hard Disk Drive (HDD) or a Solid State Drive (SSD) may be used. The computer includes the CPU 1701 that executes programs such as the pasteboard/sticky-note processing module 115, the display module 120, the sticky-note creation module 125, the setting module 130, the execution module 135 and the communication module 140, the RAM 1702 that stores the programs and data, the ROM 1703 that stores programs for starting up the computer, and the like, the HDD 1704 which is an auxiliary storage device (may be a flash memory or the like) which functions as the pasteboard/sticky-note storage module 105, the condition/procedure storage module 110, and the like, a reception apparatus 1706 that receives data on the basis of a user's operation (including a motion, a sound, an eye gaze, and the like) with respect to a keyboard, a mouse, a touch screen, a microphone, a camera (including an eye gaze detection camera, and the like), and the like, an output apparatus 1705 such as a CRT, a liquid crystal display, or a speaker, a communication link interface 1707, such as a network interface card, for connection to a communication network, and a bus 1708 for transmitting and receiving data by connecting the above-mentioned components. Plural computers may be connected to each other through a network.

Regarding the exemplary embodiment based on a computer program among the above-described exemplary embodiments, a system having this hardware configuration is caused to read a computer program which is software, and the above-described exemplary embodiment is realized by the cooperation of software and hardware resources.

Meanwhile, a hardware configuration illustrated in FIG. 17 shows one configuration example. This exemplary embodiment is not limited to the configuration illustrated in FIG. 17, and the information processing apparatus may be configured such that the modules described in this exemplary embodiment are capable of being executed. For example, some modules may be constituted by dedicated hardware (for example, an Application Specific Integrated Circuit (ASIC) or a field-programmable gate array (FPGA) the like), some modules may be provided in an external system and connected to each other through a communication link, or plural systems each of which is illustrated in FIG. 17 may be connected to each other through a communication link and operated in cooperation with each other. In addition, the information processing apparatus may be particularly incorporated into portable information communication equipment (including a mobile phone, a smart phone, a mobile equipment, a wearable computer, and the like), an information appliance, a robot, a copying machine, a facsimile, a scanner, a printer, a multifunction machine (an image processing apparatus including any two or more of a scanner, a printer, a copying machine, and a facsimile), and the like, in addition to a personal computer.

Meanwhile, the programs described above may be provided through a recording medium which stores the programs, or may be provided through a communication unit. In these cases, for example, the programs described above may be interpreted as an exemplary embodiment of the invention of "a computer-readable recording medium that stores programs".

The "computer-readable recording medium that stores programs" refers to a computer-readable recording medium that stores programs and is used for the installation and execution of the programs and the distribution of the programs.

Meanwhile, examples of the recording medium include a digital versatile disk (DVD) having a format of "DVD-R, DVD-RW, DVD-RAM, or the like" which is a standard developed by the DVD forum or having a format of "DVD+R, DVD+RW, or the like" which is a standard developed by the DVD+RW alliance, a compact disk (CD) having a format of CD read only memory (CD-ROM), CD recordable (CD-R), CD rewritable (CD-RW), or the like, a Blu-ray Disc (registered trademark), a magneto-optical disk (MO), a flexible disk (FD), a magnetic tape, a hard disk, a read only memory (ROM), an electrically erasable programmable ROM (EEPROM (registered trademark)), a flash memory, a random access memory (RAM), a secure digital (SD) memory card, and the like.

The above-described programs or some of them may be stored and distributed by recording on the recording medium. In addition, the programs may be transmitted through communication, for example, by using a transmission media of, for example, a wired network which is used for a local area network (LAN), a metropolitan area network (MAN), a wide area network (WAN), the Internet, an intranet, an extranet, and the like, a wireless communication network, or a combination of these. The programs may be carried on carrier waves.

Furthermore, the program may be part or all of another program, or may be recorded on a recording medium together with a separate program. The programs may be recorded on plural recording media by dividing the programs. The programs may be recorded in any format, such as compression or encryption, as long as it is possible to restore the programs.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a display unit that displays a predetermined region and a sticky-note on a pasteboard;
a setting unit that sets a condition for executing a procedure and the procedure on a first sticky-note arranged in the region; and
an execution unit that executes the procedure set for the first sticky-note on contents of a second sticky-note arranged outside the region on the pasteboard in a case where the second sticky-note satisfies the condition set for the first sticky-note within the region.

2. The information processing apparatus according to claim 1, wherein
the setting unit sets a representation form of the sticky-note as the condition, and
the execution unit executes the procedure set for the first sticky-note on the contents of the second sticky-note in a case where a representation form of the second sticky-note matches a representation form of the first sticky-note.

3. The information processing apparatus according to claim 1, wherein
the setting unit sets data output to another information processing apparatus as the procedure, and
the execution unit outputs the contents of the second sticky-note to another information processing apparatus.

4. The information processing apparatus according to claim 3, wherein
the setting unit sets data output to another information processing apparatus as items described in the first sticky-note, as the procedure, and
the execution unit outputs contents of a grouped second sticky-note cluster, as one set, to another information processing apparatus.

5. The information processing apparatus according to claim 1, wherein
the first sticky-note is a sticky-note indicating a legend, and
the apparatus further comprises a sticky-note creation unit that creates a new second sticky-note by copying the first sticky-note within the region to an outside of the region.

6. The information processing apparatus according to claim 5, wherein
the sticky-note creation unit creates the second sticky-note satisfying the condition set for the first sticky-note that is a copy source, and
the execution unit executes the procedure set for the first sticky-note that is the copy source on contents described in the second sticky-note created by the sticky-note creation unit.

7. A non-transitory computer readable medium storing an information processing program causing a computer that is an information processing apparatus to function as:
a display unit that displays a predetermined region and a sticky-note on a pasteboard;
a setting unit that sets a condition for executing a procedure and the procedure on a first sticky-note arranged in the region; and
an execution unit that executes the procedure set for the first sticky-note on contents of a second sticky-note arranged outside the region on the pasteboard in a case where the second sticky-note satisfies the condition set for the first sticky-note within the region.

8. An information processing apparatus comprising:
display means for displaying a predetermined region and a sticky-note on a pasteboard;
setting means for setting a condition for executing a procedure and the procedure on a first sticky-note arranged in the region; and
execution means for executing the procedure set for the first sticky-note on contents of a second sticky-note arranged outside the region on the pasteboard in a case where the second sticky-note satisfies the condition set for the first sticky-note within the region.

\* \* \* \* \*